United States Patent

[11] 3,610,287

| [72] | Inventor | Lewis V. Allgood |
| | | Rte. 2, Box 76AA, Willis, Tex. 77378 |
| [21] | Appl. No. | 16,065 |
| [22] | Filed | Mar. 3, 1970 |
| [45] | Patented | Oct. 5, 1971 |
| | | Continuation-in-part of application Ser. No. 842,163, July 6, 1969, now abandoned. |

[54] SAFETY CLEANOUT PLUG FOR SEWER SYSTEMS
12 Claims, 5 Drawing Figs.
[52] U.S. Cl. .................................................. 138/89, 4/295
[51] Int. Cl. ...................................................... F16l 55/10
[50] Field of Search ............................................ 138/89; 4/295

[56] References Cited
UNITED STATES PATENTS

| 88,386 | 3/1869 | Hoyt et al. | 138/89 X |
| 263,494 | 8/1882 | Doherty | 138/89 X |
| 1,835,418 | 12/1931 | McHardy | 138/89 X |
| 2,003,770 | 6/1935 | Goodhart | 138/89 X |
| 2,226,233 | 12/1940 | Shapiro | 138/89 X |
| 2,374,947 | 5/1945 | Micholson | 138/90 |
| 2,670,799 | 3/1954 | Dobbs | 138/89 X |
| 2,798,504 | 7/1957 | Gast | 138/89 |
| 2,869,727 | 1/1959 | Howe | 4/287 |
| 3,161,037 | 12/1964 | Logerquist | 138/89 X |

*Primary Examiner*—Henry K. Artis
*Attorney*—William E. Ford

ABSTRACT: The disclosure shows a plug assembly in releasably latched position in a sewerage system internally threaded outlet fitting. The plug includes a float lifted by sewerage rise to bear against a resiliently suspended latch bar part in tangential contact therewith for the latch bar to release latch contact with hinged mechanism mounting opposed thread segments to retract these from engagement with the internal threads of the fitting, the hinged mechanism toggling upwardly. Further sewerage rise causes float to lift lid supporting hinged mechanism, thus to vent fitting. The float lid has a bleed hole therein to avoid pressure buildup thereunder; also a gasket may be installed under the float lid to insure proper seating.

PATENTED OCT 5 1971 3,610,287

LEWIS V. ALLGOOD
INVENTOR.

BY Wm. E. Ford

ATTORNEY

SAFETY CLEANOUT PLUG FOR SEWER SYSTEMS

This application is a continuation-in-part of applicant, Ser. No. 842,163 filed July 6, 1969, now abandoned.

The invention relates to a safety clean out plug for sewer systems, the plug normally being releasably latched into an internally threaded outlet fitting, which is released by rise of sewerage in the system, first to vent through the plug, the plug then can be floated off the fitting upon further rise of sewerage.

As a primary object the invention sets out to provide a safety clean out plug for sewer systems which may be releasably latched with thread segment engaged with an internally threaded fitting in a sewer system, the plug being unlatched upon rise of sewerage level, first to vent the plug, the plug may be floated off the fitting upon further sewerage rise.

It is also an object of the invention to provide a plug of this class which is releasably latched in thread segment engaged position with the internal threads of an outlet fitting from a sewer line, and which is unlatched by the rise of a float included by said plug causing retraction of said thread segments, further rise of the liquid level in the sewer line lifting said plug to vent said sewer line through said outlet fitting.

It is still another object of the invention to provide a plug of this class which is adapted readily to be replaced manually in thread segment releasably engaged position each time the plug may be displaced from outlet fitting by excessive rise of sewerage level.

Other and further objects will be apparent when the specification herein is considered in connection with the drawings, in which.

Figures 1, 2, 3, 4, 5:
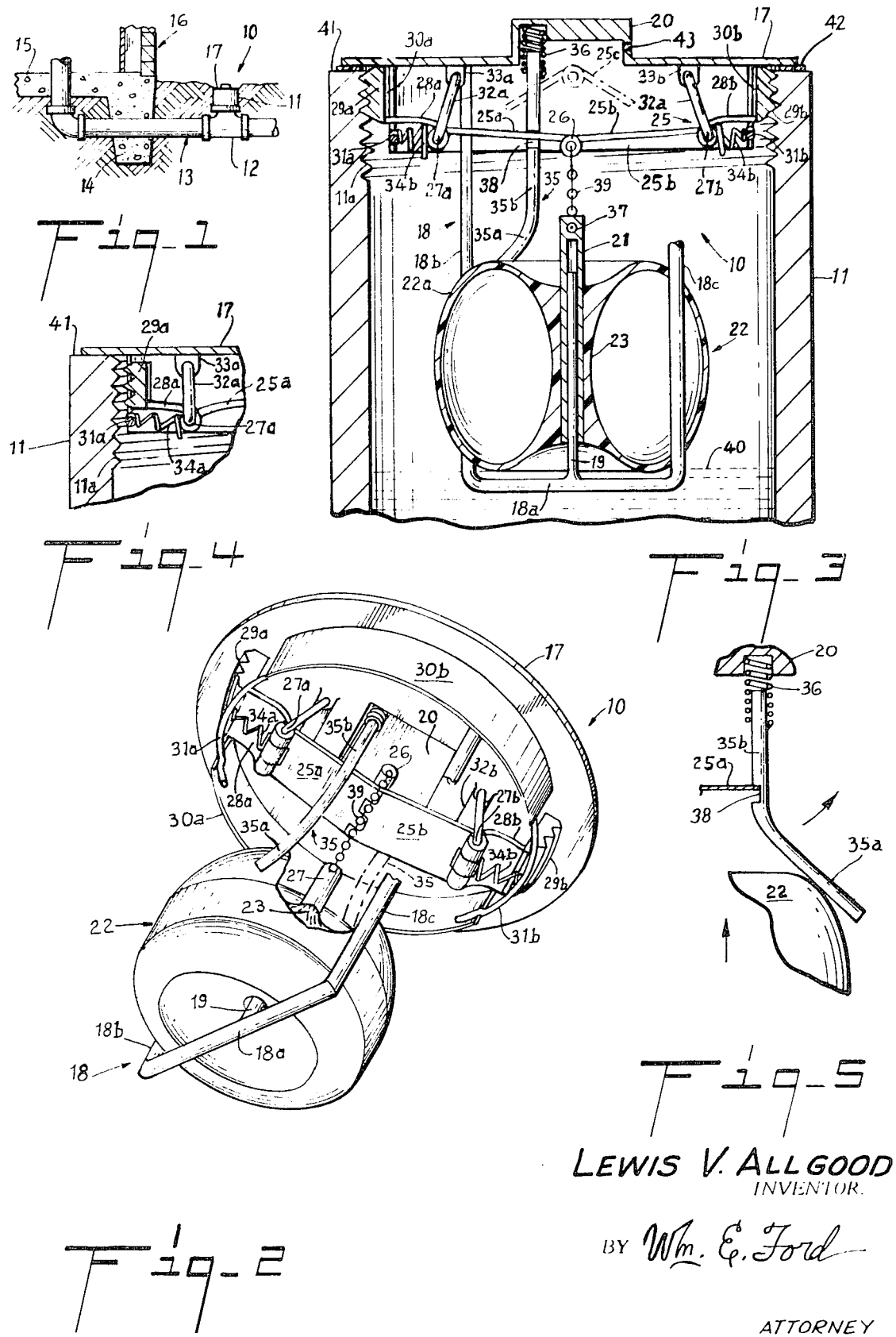
FIG. 1 is a small scale elevational view, part in section, showing a sewer system with an outlet fitting having an embodiment of the invention installed therein.
FIG. 2 is an isometric view from the under side of a plug comprising the embodiment of the invention for installation as indicated in the small scale view of FIG. 1; no gasket being shown on the float lid.
FIG. 3 is a large scale sectional elevational view, showing the plug shown in isometric view in FIG. 2, as installed in an internally threaded outlet fitting in a sewer line.

FIG. 4 is a large scale, fragmentary, sectional elevational view, showing a thread segment in retracted position with the lid of the plug thus ready to be lifted from the top face of the outlet fitting so that sewerage can be vented through the outlet fittings; no gasket being shown on the float lid; and FIG. 5 is a large scale, fragmentary, sectional elevational view, showing latch bar in hinge section latching position, and illustrating latch bar contact with float.

Referring now in detail to the drawings, in which like reference numerals are assigned to like elements in the various views, a safety clean out plug 10 is indicated in FIG. 1 as being installed with lid 17 as top closure for a fitting 11 in top of a tee 12 in a sewerage line 13 shown as passing through a formation footing 14 and upwardly through a concrete floor 15 for connection to the discharge from a toilet bowl, not shown, in a building or walled-in structure 16. As shown in FIGS. 2 and 3, such a plug 10 includes a lid 17 having a float yoke 18 connected at top to the under side of the id to extend downwardly therefrom. A centering or guide post 19 extends upwardly from the cross member 18a of the yoke 18 into a tube 21 which may be moulded into a core 23 of a hollow float 22, with shell or spheroid shaped outer wall 22a. The float 22, including core 23, is indicated as being comprised of rubber or of a plastic, preferably some bit lighter than water, so that the float 22 thus provides an element of considerable buoyancy.

The lid 17 has oppositely disposed interrupted ring segments 30a, 30b, concentric with the periphery thereof an spaced inwardly from the periphery to extend from the under side of the lid 17 and downwardly into the interior of the fitting 11 outwardly of the yoke posts 18b, 18c and inwardly of the internally threaded fitting bore 11a. Connectors 31a, 31b connect the adjacent end faces of the ring segments 30a, 30b, across the interruptions between adjacent end faces of the ring segments 30a, 30b, and slightly above the lower edges thereof, for purposes to be described hereinbelow.

A hinge assembly 25 is shown in FIGS. 2 and 3 as comprising a center hinge pivot 26 for two diametrically oppositely extending hinge sections 25a, 25b, having respective outer ends pivotally connected by outer hinge pivots 27a, 27b to respective outer hinge sections 28a, 28b. The respective outer hinge sections 28a, 28b carry respective teeth segments 29a, 29b, which may be cut from opposite sides in the upper portion of an externally threaded tubular member, the thread sections being measured when the inner tubular member is threaded full up in the fitting 11. Thus the threaded segments 29a, 29b will be disposed at elevation and in deflection with relation to the internally threaded fitting 11, as to fit into or mesh with the internal threads 11a thereof when the threaded segments 29a, 29b may be moved outwardly into thread engagement.

Swing yokes 32a, 32b, pivotally mounted upwardly in respective brackets 33a, 33b on the under side of the lid 17 and spaced respectively inwardly from the respective ring segments 30a, 30b, are swingable downwardly therefrom with the respective lower crossmembers 27a, 27b of the respective swing yokes 32a, 32b providing the aforesaid hinge pivots about which extend the cooperative hinge portions of the respective hinge sections 25a, 28a, and 25b, 28b. Thus when the hinge assembly threaded sections 29a, 29b are moved outwardly to releasably latch with the fitting threads 11a, they move above the respective connectors 31a, 31b, and through the interruption spaces between adjacent ends of ring segments 30a, 30b.

A latch bar 35 is shown with a lower leg 35a bent outwardly from an upstanding portion 35b thus substantially tangentially to contact the spheroid surface 22a of the float 22. A spring 36, with upper end engaged with the interior of a hollow, rectangular boss 20 provided centrally upon the upper side of the lid 17, has its lower end connected to the upper portion of the upper leg 35b of the latch bar 35.

The spring 36 normally urges the latch bar 35 downwardly so that the lower leg 35a bears upon the float surface 22a and such urging upon the latch bar 35 with relation to the hinge assembly 25 brings a notch 38 in the latch bar upper leg 35b into position to receive an inner hinge section, as the hinge section 28a, FIGS. 2 and 4, sidewardly thereinto. When the central pivot 26 is below a line between the swing yoke pivot members 27a, 27b, the outer hinge sections 28a, 28b carrying the respective thread segments 29a, 29b, are toggles outwardly as swung by the swing yoke radius members 32a 32b, to bring the respective thread sections 29a, 29b into engagement with the internal threads 11a of the fitting 11. As this occurs hinge engagement against the bases of respective springs 34a, 34b, result in the outer ends of these springs 34a, 34b urging against the inner surfaces of the respective connectors 31a, 31b with which they are engaged. With the hinge assembly 25 releasably latched, (hinge section 25a disposed sidewardly in latch bar notch 38, FIGS. 3 and 5), the spring 36 is in extended position and the springs 34a, 34b, are compressed, the float 22 being in a lower position upon the level of the fluid, water or sewerage 40 in the fitting 11, and just slightly above the float yoke crossmember 18a, as indicated in FIG. 3.

Then, as the sewerage level 40 rises, with the latch bar 35 suspended by its upper leg 35b connection to the suspension spring 36, the lower leg 35a may be moved upwardly and outwardly as it follows the spheroid surface 22a of the float 22. Thus a slightly further rise of the sewerage level 40, from the position shown in FIG. 2, will cause the latch bar 35 to be urged far enough sidewardly by the spheroid surface 22a of the float 22, that the latch bar 35 clears the hinge section 25a as this hinge section edge moves out of the notch 38. Then the unlatching springs 34a, 34b, free to expand, can urge inwardly on the latch assembly 25, causing the swing yoke hinge pivots or crossmembers 27a, 27b to be swung inwardly.

This movement will result in the outer hinge sections 28a, 28b, with the respective thread segments 29a, 29b, thereon, moving inwardly so that the thread segments 29a, 29b, are freed from contact with, or releasably unlatched from engagement with, the internally threaded bore 11a of the fitting 11. As the unlatching springs 34a, 34b expand to full inwardly extended position, the latch bar spring 36 resists the lifting of the latch bar 35 by the float 11, while the inner hinge sections 25a, 25b tend to remain in substantially the upwardly toggled position 25c indicated in dotted lines in FIG. 3. Noticeably, a chain 39, or any other type of string or line connection means, may have its end connected to respective ends of the central hinge pivot 26, the chain passing centrally through a lateral bore 37 through the head of the hollow guide post 19 to establish a loose connection between hinge assembly 25 and yoke 18 and thus to entrap the float 22 from being last as when the plug 10 may be displaced from the fitting 11 upon rise of sewerage.

With the thread segments 29a, 29b disengaged and retracted, as the sewerage 40 rises in the fitting 11, the float 22 can lift the lid 17 from the top surface 41 of the fitting 11, or from a gasket, not shown, which may be installed upon the fitting top surface 41. Optionally, such a gasket, now shown, may be affixed to annular outer surface on the under side of the lid 17. The float 22 in this case, bears against the lower leg 35a of the latch bar 35, which has been displaced sidewardly after the notch 38 in the upper latch bar leg 35 has been freed the inner hinge section 25a for thread unlatching movement. Such lifting action can continue until the whole plug 10 may be lifted upwardly with relation to the fitting 11 until it may topple over from the fitting top 41 on the ground.

There is thus provided a plug 10, which will operate automatically to vent a sewerage line 13 through an outlet fitting 11, thus first to let out any accumulation of gases. The plug will automatically release thread segment engagement responsive to rise of liquid in the sewerage system and let the system discharge liquid over the top of the fitting while the plug still remains in limited engagement with the outlet fitting, or the sewerage may rise to displace the plug from the fitting. In any case the plug may be manually removed, cleaned and manually reset and replaced.

The plug may be replaced in position manually and with ease and rapidity, (as the sewerage system level descends), and used over and over again, after each venting of the system.

As a noticeable variation or addition, a more balanced operation can be obtained by providing opposed latch bars 35, the reference numeral 35 to a dotted line indication of such second latch bar being a diagrammatic representation of such a balanced latch bar arrangement, including the necessary associated elements whereby the inner hinge section 25a may be notch latched on opposed sides thereof.

In many cases it can be appreciated that, when the lid 17 is latched into smooth, tight-fitting position on the top surface 41 of the fitting 11, so that no air or gases escape as the sewerage 40 rises in the fitting, a consequent buildup of pressure may obtain. Such a buildup of pressure could result in rupture or blow off, or in the advanced operation of the plug 10 before the sewerage has risen to the predetermined elevation in lifting the float 22. However, it is desired to have this smooth, tight fitting of the lid 17 on the aforesaid top surface 41 to improve the latching and fitting of the latch segments 29a, 29b, so that they fully seat when the plug is to be in latched position.

In view of the foregoing, an annular gasket 42 is shown in FIG. 3 seated upon the surface 41 beneath the under peripheral surface of the lid 17. Also a bleed hole 43 is shown provided sidewardly through the central boss or raised section 20 of the lid 17, thereby to allow escape of excess air and gases that otherwise could build up, as entrapped with the plug under the lid 17 and above the level of the sewerage 40 as it rises. Obviously, in cases where a smooth fit of lid 17 upon the surface 41 is assured without a gasket 42, such gasket may be omitted.

An invention, as disclosed, fills a great need where presently if a sewerage system has a stoppage or tend to overflow in a locality, without such vent plugs, there results the filling up and overflowing of those commodes disposed lowermost in a system. Such invention is not limited to the particular structural combinations disclosed, but other variations, modifications and embodiments may fall within the spirit thereof, the claims thereto being exemplary and not with particularity.

I claim:

1. A plug including a lid with hinge and float assembly thereunder including toggle means, said hinge comprising centrally pivoted, complementary hinge portions swung from under the lid by respective hinge pivots and carrying opposed thread segments at their respective outer ends, said toggle means being adapted to extend said opposed, hinge portion thread segments into engagement with internal threads of an outlet fitting as the lid seats upon the outlet fitting upper face and as the hinge is releasably latched in a lower position against counter urging of opposed unlatching springs thereagainst, said hinge being unlatched by sewerage lift of said float in relation to said assembly, whereby aid unlatching springs may urge said hinge to a toggled upper, thread segment disengaged and retracted position whereby said hinge is disposed in a central pivot uppermost position, and whereby said float my be further sewerage lifted to lift said lid from said upper face contact.

2. A plug as claimed in claim 1 in which said hinge assembly includes oppositely interrupted ring segments spaced with the lid periphery concentric therewith and extending downwardly within said outlet fitting, a connector bridging the lower part of each interruption and over which said thread segments may move outwardly, and against which said unlatching springs may bear in opposing hinge movement downward to releasably latched position.

3. A plug as claimed in claim 1 in which said float assembly includes a float yoke extending downwardly from the under side of said lid and having an upstanding center post, said float assembly also including a hollow float with a central core comprising an upwardly extending, central guide bore to receive said center post therein, whereby said float is centrally directed in upward lift against said toggle means to unlatch said hinge.

4. A plug as claimed in claim 1 in which said hinge and float assembly includes a latch bar with upper leg yieldably suspended under said lid to dispose a notch therein in releasably latched, side engagement by said hinge, said latch bar also including a lower leg extending angularly downwardly and outwardly to be moved by float contact to position said latch bar in notch disengaged position to unlatch said hinge.

5. A plug as claimed in claim 1 in which said hinge assembly includes inner hinge sections pivoted about a centrally disposed inner hinge pivot and outer hinge sections pivotally connected by outer hinge pivots to respective inner hinge sections, swing yokes swingably connected upwardly to the under side of said lid and providing said outer hinge pivots lowermost, said thread segments being carried by said outer sections to be disengaged and retracted by inner swing of swing yokes responsive to urge of said unlatching springs.

6. A plug as claimed in claim 1 in which said float assembly includes a hollow float of spheroid exterior and with a central core therethrough, and in which said float is comprised of a light, resilient material including at least one of rubber and light plastic.

7. A plug as claimed in claim 1 in which said thread segments are constructed, and adapted by said hinge assembly, for movement into meshed engagement with matching threads of corresponding pitch and diameter provided within said outlet fitting.

8. A plug as claimed in claim 4 in which said latch bar is of length to separate said plug from said hinge assembly whereby said float bears against said latch bar in lifting said plug upwardly responsive to sewerage level rise in said fitting.

9. A plug as claimed in claim 4 in which a second latch bar is provided and oppositely disposed across said float from said first latch bar.

10. A plug as claimed in claim 1 in which said latch bar is yieldably suspended by means based in the underside of a central boss provided by said lid.

11. A plug as claimed in claim 1, in which the lid provides a small bleed hole therethrough.

12. A plug as claimed in claim 11, in which the plug provides an annular gasket under the lid peripheral area.